March 8, 1960 R. J. CORMIER 2,927,538
MATERIAL HANDLING APPARATUS
Filed April 9, 1956 4 Sheets-Sheet 2
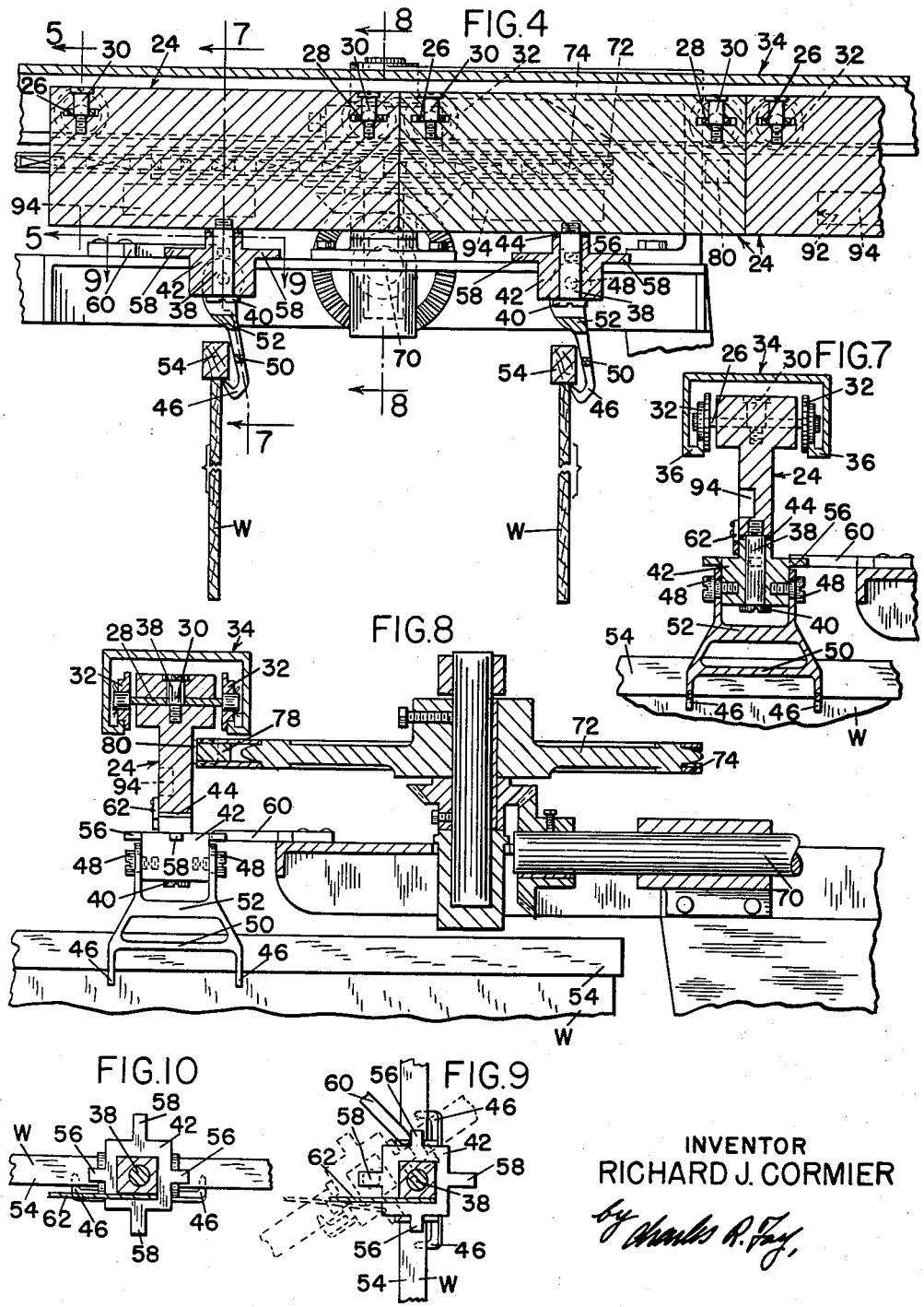
INVENTOR
RICHARD J. CORMIER
ATTORNEY March 8, 1960 R. J. CORMIER 2,927,538
MATERIAL HANDLING APPARATUS
Filed April 9, 1956 4 Sheets-Sheet 3
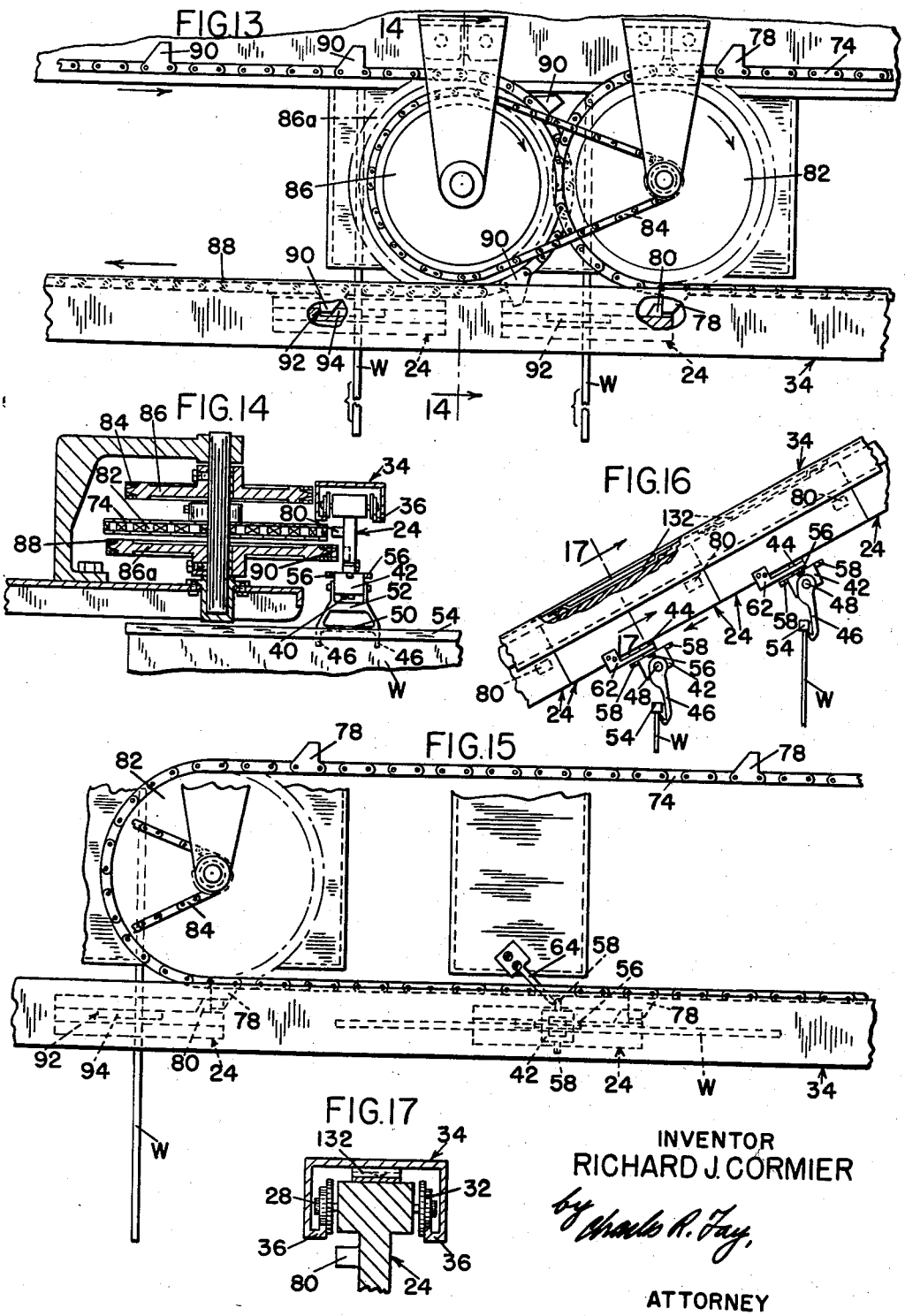
INVENTOR
RICHARD J. CORMIER
by Charles R. Fay
ATTORNEY March 8, 1960
R. J. CORMIER
2,927,538
MATERIAL HANDLING APPARATUS
Filed April 9, 1956
4 Sheets-Sheet 4
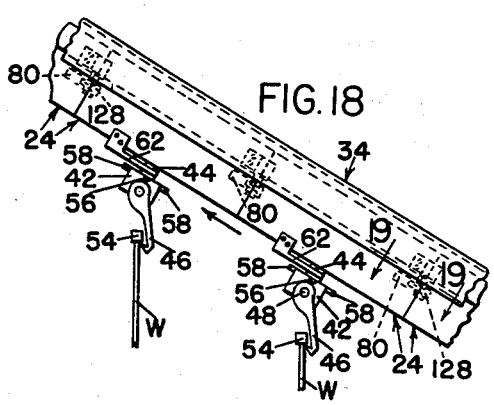
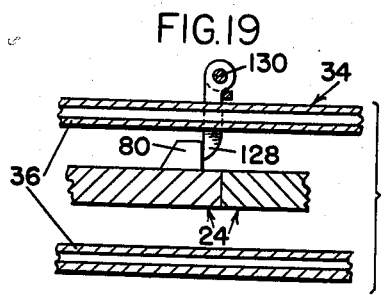
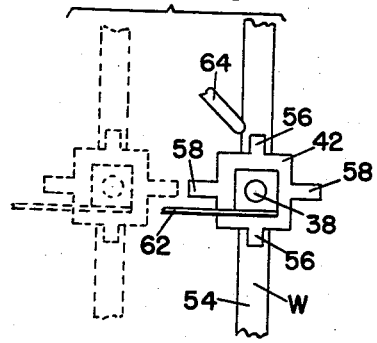
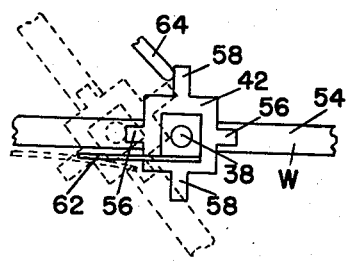
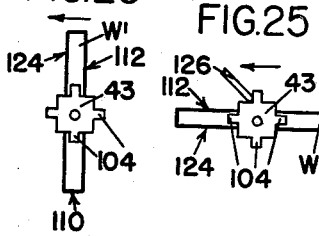
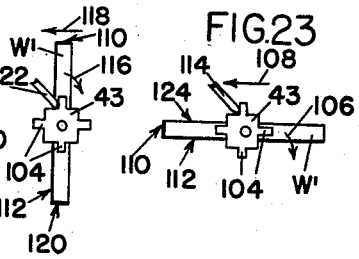
INVENTOR
RICHARD J. CORMIER
ATTORNEY United States Patent Office 2,927,538
Patented Mar. 8, 1960

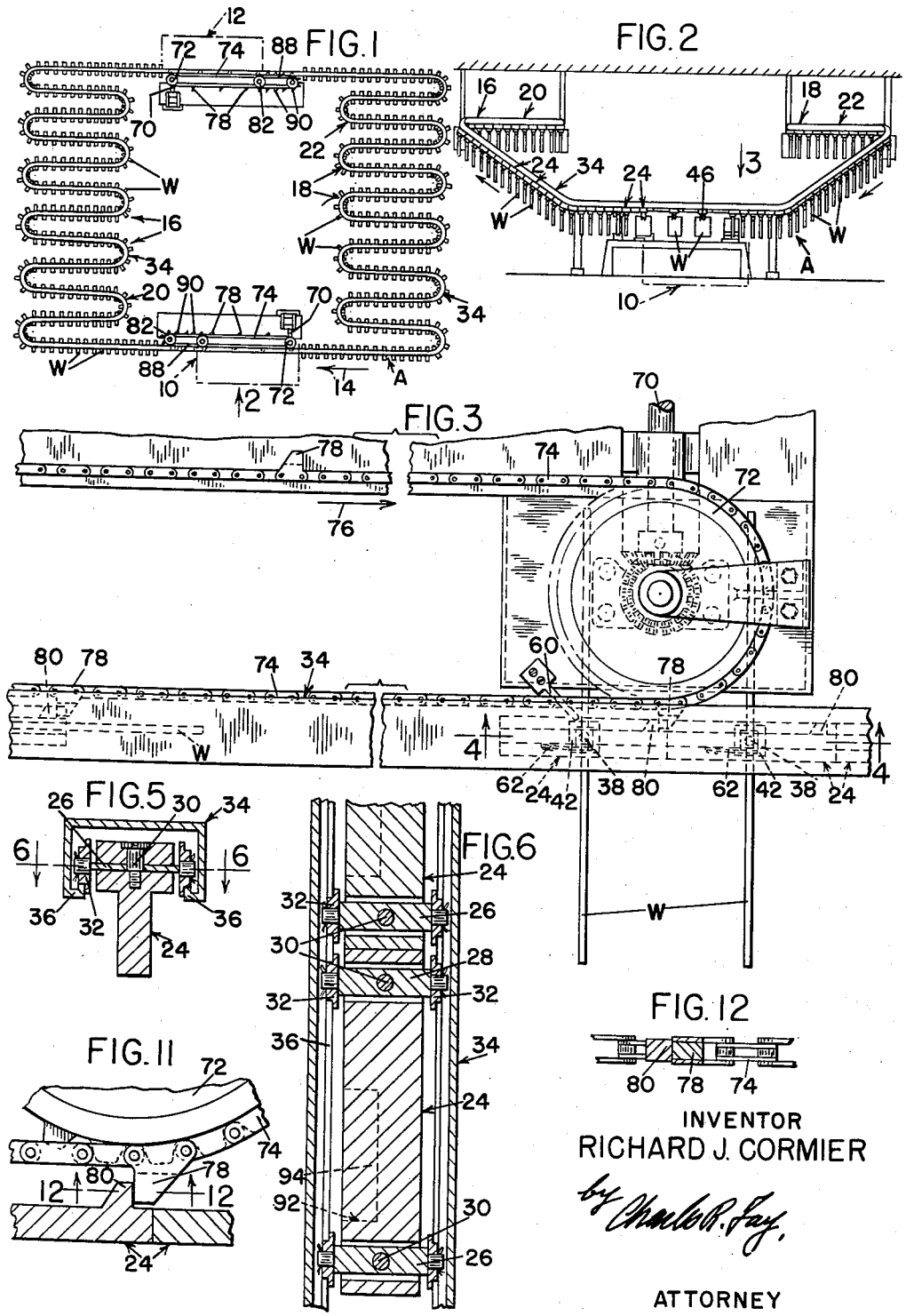

2,927,538

MATERIAL HANDLING APPARATUS

Richard J. Cormier, Gardner, Mass.

Application April 9, 1956, Serial No. 577,065

4 Claims. (Cl. 104—172)

This invention relates to a new and improved apparatus for handling materials, particularly panels, for spray painting, varnishing, or other operations, etc., and the principal object of the invention resides in the provision of an overhead conveyor system for handling materials which are normally in panel, sheet or board-like form, conveying the same over a long course in close arrangement in face-to-face relation, i.e. in parallel planes to provide for drying while using a minimum of factory space or area; the provision of a conveyor system for moving articles seriatim slowly over a long course, i.e. in the neighborhood of a distance of one or two thousand feet, and then changing the angle of travel of each member to an edge-to-edge co-planar relation and speeding the travel thereof past or through a painting or varnishing area, including the provision of means for again returning the members to the original face-to-face alignment whereby a long course of the conveyor is usable for drying purposes without the necessity for using a great amount of space.

Further objects of the invention include the provision of a substantially continuous conveyor system including a series of slugs which are pushed along the course of the conveyor, as on an overhead monorail, for instance, each slug being provided with a rotatable hanger member or the like for suspending an article to be processed therefrom, said articles being traveled along the main course of the system in side-by-side aligned condition with the direction of travel being normal to the greatest dimension of the various pieces in order to provide for the greatest number of pieces being traveled in the smallest possible space, in combination with means for turning the pieces individually as they reach a processing station such as a spray-booth or the like, whereby said pieces proceed through the spray-booth or area in edgewise aligned coplanar condition, so that they may be easily sprayed or otherwise processed at each broad side thereof, and at the same time providing for a greatly increased speed of travel for individual slugs bearing the pieces being processed; and the provision of a system as above described which is made in multiples, so that two coats of paint or varnish may be applied to the individual pieces without materially increasing the factory floor space required.

Other objects of the invention include novel means for rotating the workpieces individually at certain specified points in order to carry out the main purposes of the invention and also in particular, means for rotating the same in various combinations of parts as will be made clearer hereinafter.

Other objects and advantages of the invention will appear hereinafter.

Reference is to be had to the accompanying drawings, in which

Fig. 1 is a diagrammatic plan view illustrating the entire system;

Fig. 2 is a view in side elevation, looking in the direction of arrow 2 in Fig. 1;

Fig. 3 is a greatly enlarged fragmentary plan view looking in the direction of arrow 3, Fig. 2;

Fig. 4 is an enlarged sectional view, taken on line 4—4 of Fig. 3;

Fig. 5 is a section taken on line 5—5 of Fig. 4;

Fig. 6 is a section taken on line 6—6 of Fig. 5;

Figs. 7, 8 and 9 are sectional views on the respective lines in Fig. 4;

Fig. 10 is a view similar to Fig. 9 illustrating the workpiece hanger means;

Fig. 11 is an enlarged view of a portion of Fig. 3 illustrating the coaction between the traveling lugs on the power-operated means and on the various slugs;

Fig. 12 is a section on line 12—12 of Fig. 11;

Fig. 13 is a continuation of the apparatus shown in Fig. 3;

Fig. 14 is a section on line 14—14 of Fig. 13;

Fig. 15 is a continuation of Fig. 13;

Fig. 16 is an enlarged view in elevation illustrating the progress of the workpieces on a downward incline, part being in section;

Fig. 17 is a section on line 17—17 of Fig. 16;

Fig. 18 is a view similar to Fig. 16 but showing the pieces traveling upwardly on an incline;

Fig. 19 is an enlarged section on line 19—19 of Fig. 18;

Figs. 20 and 21 are diagrammatic views illustrating the rotation of the work carriers; and Figs. 22 to 26 inclusive are diagrammatic illustrations of a modification of the invention illustrating a more fully automatic construction.

In many instances of high-speed modern production, as in parts for furniture, for instance, it is clearly advantageous to varnish or paint the parts as they pass a station, and to dry the parts while still traveling, to avoid costly handling, racking in drying rooms, and otherwise interrupting the flow of the manufacturing process. Many problems are involved in setting up continuous high-speed production lines, especially where parts require a time interval for drying, and among these problems is that of providing sufficient factory floor space for the conveyor system. This invention solves this problem, among others.

Regular overhead conveying systems are chain driven throughout and since there can be no breaks in a chain conveyor, it has been impossible heretofore to change the speed and open and close the pack at different locations on the conveyor, which is a prime object of the present invention. The individual trolleys or slugs in the present case, to be later described, are separated and can be separated or moved together between the open pack and closed pack portions of the drive of the conveyor. Separate drives or varying speed drives can be used from one central control system or coordinated to give the required increase or decrease in speed to different parts of the conveyor; this being coordinated to opening and closing the packing of the slugs or trolleys. It is also pointed out that the units being handled which may be in the form of panels may be automatically turned at 90° between the open pack and closed pack situations, but there may be times when it is preferred to turn the panels by hand without the use of automatic turning equipment. The point is that by means of the present invention an overhead conveyor is utilized which may be coordinated to increase and decrease the speed, the increased speed resulting in the separation of trolleys or slugs and in an open pack relationship; while decrease in speed of the trolleys or slugs results in closer spacing or close packing of the panels. The open pack requires an increase in speed to provide the opening or spacing of the different slugs or trolleys; whereas when the close packing is desired, the speed of the trolleys or slugs naturally has to be slowed down or decreased.

Referring now to Fig. 1, there is shown in general a long sinuous conveying system which is illustrated as generally continuous and having two separate processing areas generally indicated at 10 and 12, these processing areas being spray-booths or the like where an operator is stationed for the purpose of operating upon workpieces driven past by the conveyor, as for instance in the direction of arrow 14 in Fig. 1. There may be one or any number of these stations.

The individual workpieces are indicated by the letter W and it will be noted that these workpieces are aligned in parallel multi-planar face-to-face formation, one after the other, it being assumed for the purposes of illustration of the invention that the workpieces are generally flat and rectangular in section. However, at the areas of the processing stations 10 and 12, these pieces are turned into uni-planar relationship, so that the broad sides of the individual workpieces are presented parallel to the line of travel rather than normally thereto as is the case during the elongated portion of the travel of the workpieces in the sinuous areas which are generally indicated by the reference numerals 16 and 18 respectively.

This construction is perhaps better illustrated in Fig. 2 wherein the workpieces shown at the processing area 10 are clearly shown as being broadside, passing the observer, whereas in the remainder of the conveying system, they are shown in edge relationship to the observer.

It is an important part of the present invention that the relative speed of feed of the workpieces W in the areas 16 and 18 on the one hand and the processing areas 10 and 12 on the other hand be clearly differentiated, an example of this differentiation being, for instance, a traveling of 1½ feet per unit of time in the areas 16 and 18 and a travel of 10½ feet per unit of time in the processing areas 10 and 12. Although other relationships come within the scope of the invention, this particular relationship has been found to be particularly efficacious in the spraying of wooden panels for the furniture industry, allowing plenty of time for complete spraying of the parts at the stations 10 and 12 and a complete drying therebetween without the necessity of utilizing drying ovens or enormous areas of factory space as is otherwise the case. At the position marked A or thereabouts, there may be a loading and unloading station where the completed, double-coated members may be withdrawn from their carriers and the new as yet unprocessed members applied to the system.

Another feature of the invention is also shown in Fig. 2 wherein the line of advance of the workpieces W is upwardly from station 10 to the general sinuous level at 20. In the area 20, the sinuous passages shown in Fig. 1 are located well above the factory floor which may be therefore utilized for other purposes. At the end of the long sinuous passage 20, the system descends to station 12 and thereafter again rises to the general sinuous area 22. The loading station is indicated in Fig. 2 also.

Each workpiece W is shown as suspended from overhead, by what is herein referred to as a "slug," there being a slug for each workpiece. These slugs are in the nature of trolleys, being indicated generally at 24 and each slug is provided with a forward wheeled truck 26 and a like rear wheeled truck 28, each truck being pivotally mounted by a vertical pin 30 best shown in Fig. 5, these pins 30 being screwed into the slugs as clearly shown and holding the flat plates forming the trucks 28 in position for swiveling sufficiently to pass around the curves of the track. Each truck is provided with wheels 32 as shown and these wheels ride in the mono-rail generally indicated at 34 having double-spaced tracks 36 receiving the wheels described as in Fig. 5.

Each slug 24 has threaded into its lower edge a swivel-pin 38 which depends therefrom, terminating in a head 40 supporting a swivel block 42. The swivel blocks 42 are preferably square and provided with an upper shoulder or the like facing the bottom edge of the respective slug 24; and interposed therebetween there is a friction washer 44 (see Fig. 7) so as to provide against free swinging of the rotary blocks 42 on their pin 38.

Swivelly depending from each of blocks 42, there is a double hook illustrated at 46, 46, these hooks being swivelly held to the respective blocks 42 by means of fasteners 48, which allow the hooks 46 to swing back and forth for a purpose to be made more apparent hereinafter. The hooks 46 are widely spaced and are connected by a brace 50 and a handhold 52.

As shown in Fig. 4, the hooks are used to support and suspend the workpieces W by a flange or rib 54. This flange or rib may be a part of the workpiece W, or it may merely be an attachment for the particular purpose of providing for the suspension of the workpiece. Any other way of suspending the workpieces may of course be used without departing from the scope of the invention.

It will be seen that the workpieces may swivel on a vertical axis in pin 38 and the workpieces may also swivel to a limited degree on a horizontal axis which is through the centers of fasteners 48. The latter construction provides for the workpieces remaining in correct vertical position when traveling downwardly as in Fig. 16 and upwardly as in Fig. 18.

The individual slugs 24 are driven forwardly along the mono-rail which has the shape shown in Figs. 1 and 2 merely by pressing one against the other, and the means for driving the slugs will be described hereinafter.

Each work-carrying block 42 is provided with four radially outwardly extending lugs, and these are located in a single horizontal plane. The lugs are indicated by the reference numerals 56, 56 and 58, 58, those at 58 being longer than those at 56, as it is clearly shown (see particularly Figs. 9, 10, 20 and 21). A very simple means is provided for engaging these respective fingers and rotating the carriers 42 and with them the workpieces W from the face-to-face relationship as shown in the sinuous parts of the system to the edge-to-edge relationship at the operating stations 10 and 12. This means comprises a finger 60 which may be mounted upon a framework in any way desired. Its position is such as to engage one of the lugs 56 (or possibly 58) so as to cause turning of the carrier 42 and with it its workpiece as for instance from the solid line position in Fig. 9 through the dotted line position thereof into the solid line position of Fig. 10. This construction will not provide for a complete 90° turn and therefore means is provided for completing this action. This means includes a flat spring 62 which is displaced as shown in dotted lines in Fig. 9 from its normal position against a flat side of the carrier block 42 during a partial turning of the block. However, when one of the corners of the latter have passed a central position under influence of finger 60, then the spring causes a snapping action with respect to the block 42, completing the 90° turn to the position of Fig. 10. Spring 62 may be attached to a fixed part of the framework at any desired location, but it is free-ended as shown in Figs. 9 and 10 for the purpose described.

With the workpieces in the now uni-planar relationship, they may be sprayed at either or both sides thereof at the station 10 but it is preferred that they should be sprayed or otherwise processed at one side only thereof and that they should be reversed or turned 180° for spraying or otherwise processing the opposite side. This may be done by the operator himself by grasping the handle portion 52 and swinging the workpiece and its block 42 through the arc necessary to achieve this purpose.

After both sides have thus been sprayed, the block 42, being traveled in spaced relation to both preceding and successive slugs and workpieces, by means to be described, encounters a successive finger 64 (Fig. 15) which impinges upon one of the lugs 56 or 58 as the case may be to again turn the block 90° again in a clockwise direction to assume the solid line position of Fig. 15, whereupon the conveyor again travels the individual slugs in abutted relationship throughout the entire long sinuous area 16 to the second station 10, wherein the operation as described once more takes place. Thereafter the pieces proceed along the sinuous course at 18 to the loading or unloading station A where they are removed by an operator and a new piece W is positioned.

Now referring to Figs. 3, 4, 8, 13 and 15, the power-operated mechanism is shown in these figures for traveling the slugs both along the slow speed courses 16 and 18 and the high speed areas at 10 and 12. A shaft 70 may be driven by any power means desired such as an electric motor, and this in turn drives at a relatively high speed a sprocket or the like 72 which drives a chain or the like 74 in the direction of the arrow 76 (Fig. 3).

At widely spaced intervals on chain 74, there are provided some special lugs 78 which extend laterally outwardly to engage specially provided lugs 80 on the slugs 24 (see particularly Fig. 11). The chain 74 extends the length of station 10, so that the lugs 78 will engage lugs 80 to progress the individual slugs at a high rate of speed and in spaced relation throughout the length of the station 10. It is understood that the individual slugs 24 are entering as for instance from the right-hand end of Fig. 3 and in end-to-end abutted relation, and the leading end of one slug engages the trailing end of the preceding slug so as to drive the entire range of slugs throughout the area 18 to the area of sprocket 72. It is also to be understood that the chain 74 is proceeding at a high rate of speed with respect to the speed of travel of slugs 24 as far as the area of the sprocket 72. As soon as a lug 78 has pushed a slug 24 a sufficient distance away from the succeeding slug 24, the finger 60 is engaged at the right instant to turn the workpieces as above described without interference between one workpiece and another.

The chain 74 thus progresses the individual slugs in separated condition at a relatively rapid rate of speed throughout the station 10. The chain 74 is arranged to drive an end sprocket 82 (see Fig. 13) and by means of a reduced gearing which may consist of a chain 84 and sprocket 86, a second chain 88 is driven at a much slower rate of speed. Chain 88 is provided with a number of closely spaced lugs 90 which travel in the direction of the arrows in Fig. 13 and engage in the shoulder 92 which is formed by a recess 94 in each slug, to drive the individual slug forwardly and to cause it to abut the preceding slug as above described to force the slugs and workpieces throughout the sinuous area 16.

The action of the two chains 74 and 88 is that the same are timed so that as a lug 78 of chain 74 leaves the lug 80 of the respective slug 24, a lug 90 of sprocket 86 engages in the shoulder 92 and the power is thus transferred from one chain to the other, driving the slugs forwardly and changing the speed, so that the same is considerably reduced. This is accomplished by the means shown without interference between the chains or chain lugs.

It will be noted that the lugs 56 and 58 are of different lengths and the reason for this resides in the fact that if the operator correctly processes the workpieces as above described, the same will be changed by the rotation of the block 42 from the uni-planar position thereof to the face-to-face relationship as by finger 64. However, supposing that by some error the operator had occasioned an additional turning of the block 42 and workpiece W to the solid line position of Fig. 15 by mistake, the parts are so arranged that finger 64 will fail to engage lugs 56 and thus the workpieces will become correctly aligned, regardless of errors on the part of the operator (see Figs. 20 and 21). Such an error as described does not effect the operation on the workpieces because the spraying or other operation is accomplished as described above. A good operator might be apt to turn the block 42 and workpiece too fast so that it over-travels in its rotational motion to the incorrect alignment prior to reaching the finger 64 and therefore the short and long lugs 56 and 58 are provided to automatically overcome any such errors on the part of the operator.

It is preferred that the shaft 70 shall be driven by a variable speed gear reducer or the like in order to adjust the operation of the system to the best speed possible for the particular operation provided at the stations 10 and 12.

If it is desired for the rotation of the workpieces W to be automatic rather than under the control of the operator in order to control the same more exactly, it is simple enough to provide extra block turning fingers for this purpose. This situation is illustrated diagrammatically in Figs. 22 to 26 inclusive wherein the pieces W' enter at the right-hand side of the disclosure in the direction of the straight arrows 100 and the block 43 from which the work is suspended is rotated as above described as to block 42 by means of the finger 102 engaging the lug 104. In this case, all of the four lugs 104 are the same length, as it is not necessary to have different finger lengths for the automatic operation to be described.

A quarter turn on the work is accomplished by this means, so that the work W' is now in the position shown in Fig. 23 and it has been turned in the direction indicated by arrow 106 while it is still travelling in the direction indicated by arrow 108. In the showing of Fig. 22, the operator may spray the edge 110 and when the work changes to the position of Fig. 23, he may spray surface 112.

At the next station, another finger 122 will turn the work in the direction of arrow 116 to the position illustrated in Fig. 24 while the work is still progressing in the direction of arrow 118, and in this position the edge at 120 may be sprayed by the operator.

Another finger 126 then turns the work another quarter turn where the surface 124 may now be sprayed and thereafter the finger 126 again turns the carrier 43 and the work to the position shown in Fig. 26, whereupon the workpieces are brought closely together as above described and proceed throughout the system in order to be dried and to receive the second process at station 12 which is a duplicate of that described.

Referring now to Fig. 19, there is shown a pivoted lug or stop 128 which may be pivoted as at 130 on the mono-rail 34. The purpose of this stop is to prevent retrograde motion of the slugs as they rise as shown in Fig. 18. These stops may pivot in a clockwise direction in Fig. 19 and not in a counter-clockwise direction and thus it will be seen that in case of a gap between slugs 24, the stops 128 will prevent the slugs and workpieces from sliding back down to the right in Fig. 18.

Referring to Fig. 16, showing the individual slugs 24 traveling downwardly, there is a friction spring 132 which prevents the individual slugs 24 from sliding downwardly at too great a speed in the event of a gap between slugs. This spring is also shown in Fig. 17 and it will be seen that it is attached to the under side of the top portion of the mono-rail 34.

Having thus described my invention and the advantages thereof, I do not wish to be limited to the details herein disclosed, otherwise than as set forth in the claims, but what I claim is:

1. A system for continuously processing a series of work pieces comprising a combination of an endless overhead conveyor track, means for moving the work pieces along the track, each said means including a slug, each slug including means for suspending a work piece in a swivelling relation so that it may travel in face to face closely packed relationship, or in edge to edge aligned spaced relationship, and said conveyor means including means for increasing speed of travel of said slugs to increase the relative spacing to an open pack, said means also being capable of slowing the speed of said slugs to a closer relationship in closed packed relation of the workpieces.

2. A system for continuously processing a series of flat work pieces including an endless overhead conveyor for suspending and moving said work pieces along the conveyor, a series of trolleys or slugs mounted on said conveyor, and means suspending the work pieces from the trolleys or slugs, the latter including means providing for turning the pieces to align them in a single plane or to arrange the same in a face to face parallel relationship, and means for increasing the speed of travel at selected portions of said conveyor for spreading out the work pieces in an open pack relationship together with means for thereafter decreasing the speed of travel of the trolleys or slugs to arrange the work pieces in a close packed relationship.

3. A conveying system for processing work pieces including an endless overhead conveyor, a series of trolley elements movable along said conveyor, means to travel said elements along the conveyor, a swivel work piece support on each trolley element, the work pieces being individually suspended from said supports, and means to travel the individual trolley elements selectively at increased speed or at a decreased speed, said means being arranged at certain predetermined points along the length of the conveyor whereby said trolley elements are controlled as to close spacing and open spread spacing at said predetermined points.

4. A conveyor system for processing work pieces including an endless conveyor, a series of trolley elements for individual travel along said conveyor, a swiveled work supporting member on each said trolley elements, means to support a work piece on each member, means increasing the speed of the individual trolley members, and means for thereafter reducing the speed thereof at certain specified predetermined positions along the conveyor.

References Cited in the file of this patent
UNITED STATES PATENTS

| | | |
|---|---|---|
| 452,791 | Jackman | May 26, 1891 |
| 761,484 | Hetzel | May 31, 1904 |
| 2,040,353 | Wilson | May 12, 1936 |
| 2,546,374 | Rayburn | Mar. 27, 1951 |
| 2,567,438 | McBride | Sept. 11, 1951 |
| 2,575,914 | Griffin et al. | Nov. 20, 1951 |
| 2,593,699 | Rose | Apr. 22, 1952 |
| 2,619,916 | Rainier | Dec. 2, 1952 |
| 2,640,580 | Burgh | June 2, 1953 |
| 2,751,851 | Curtis et al. | June 26, 1956 |